A. W. K. BILLINGS.
ELECTRIC PRESSURE RATIO INDICATOR.
APPLICATION FILED MAY 20, 1909.
965,274.
Patented July 26, 1910.
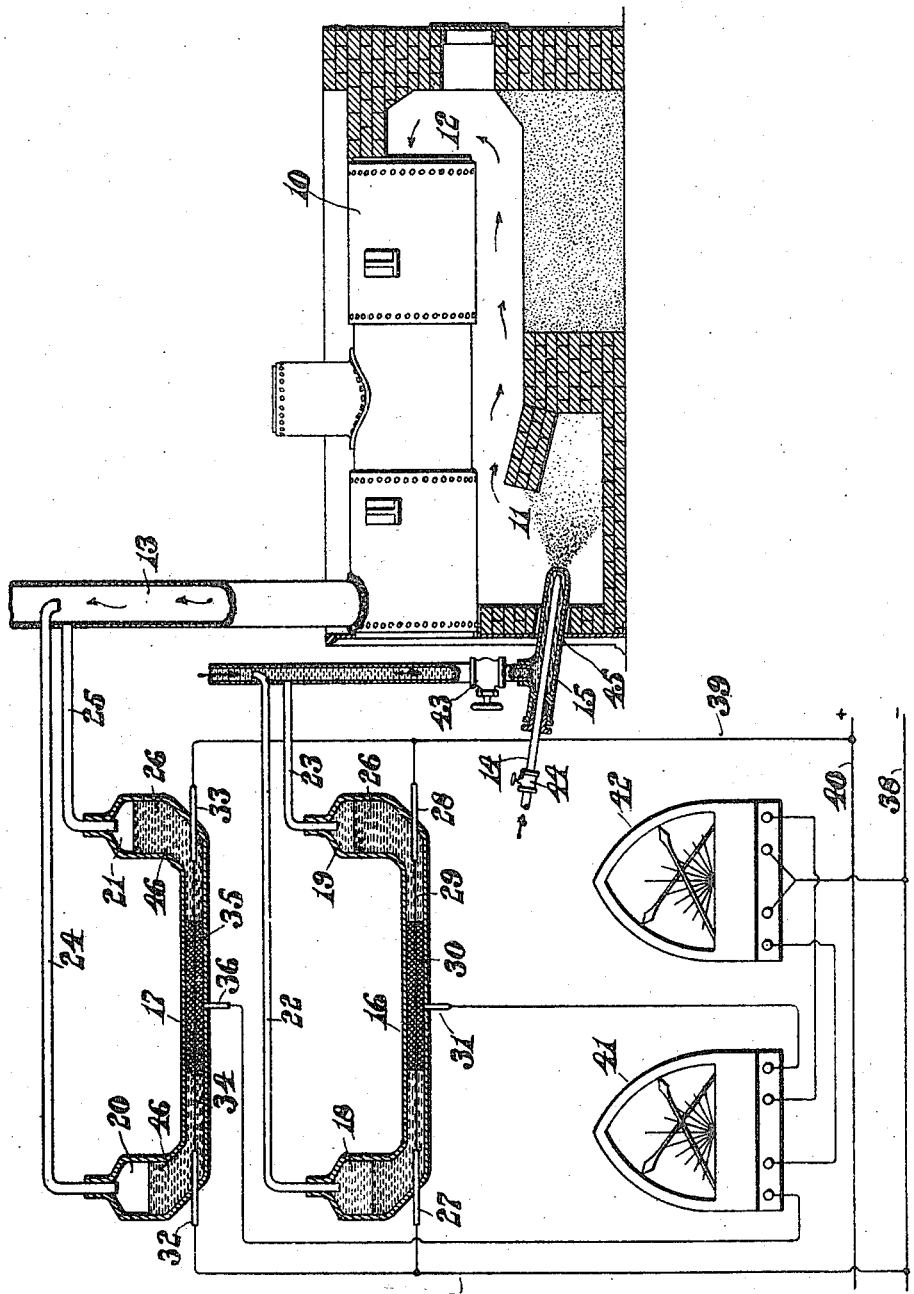
Witnesses:
Nathan C. Lombard
Howard Hanscom
Inventor:
Asa W. K. Billings,
by Walter E. Lombard,
Atty.

UNITED STATES PATENT OFFICE.

ASA WHITE KENNEY BILLINGS, OF HABANA, CUBA.

ELECTRIC PRESSURE-RATIO INDICATOR.

965,274.

Specification of Letters Patent. Patented July 26, 1910.

Application filed May 20, 1909. Serial No. 497,364.

*To all whom it may concern:*

Be it known that I, ASA WHITE KENNEY BILLINGS, a citizen of the United States of America, and a resident of Habana, in the Province of Habana and Republic of Cuba, have invented certain new and useful Improvements in Electric Pressure-Ratio Indicators, of which the following is a specification.

This invention relates to an apparatus adapted to co-act with a device in which there exist differences of pressure in different portions thereof, to determine accurately the ratio of the said differences of pressures, and it consists in providing suitable receptacles, the ends of each of which are connected by pipes to two portions of said apparatus so that the pressures in said two portions may act upon a liquid contained within said receptacle and thereby indicate by suitable means the ratio of the said differences of pressures in the different portions of said device.

It further consists in providing an electrically operated indicator which is so connected to different parts of said apparatus that the differences of pressures existing in the different portions will operate it and cause a visual indication to be made of the ratio of said differences of pressures in said different portions.

The invention further consists in a very simple and effective electrically controlled instrument for indicating to the operator the ratio of the differences of pressures existing in any two portions of said device.

The invention also consists in a novel means of controlling this indicating instrument by means of an electric current passing through a resistance wire and including means for regulating the proportional length of wire traversed by said current thereto, this means of regulation being operated by the variations in the difference of pressure in different portions of said apparatus.

It consists, moreover, in an inclosed chamber, the opposite ends of which are connected by pipes to two different portions of the apparatus and provided with a passage between the two ends thereof partially filled with a thread or column of mercury capable of movement lengthwise of said passage and through which extends a resistance wire having a terminal for the passage of the electric current to the indicating instrument.

It consists further in including in an electric circuit containing a resistance wire, the proportional length of which that is traversed by the electric current being determined by the variation in the difference of pressure in two portions of said apparatus, of a plurality of indicating instruments adapted to be simultaneously operated in different locations so that the actual operation of the apparatus may be made known to the various workmen or officers responsible therefor.

The invention further consists in certain novel features of construction and arrangement of parts which will be readily understood by reference to the description of the drawings and to the claims hereinafter given.

The drawing shows a section of a boiler and a diagram drawn to an enlarged scale representing the indicating instrument and the apparatus connected to the boiler for electrically controlling the operation of said indicators by the variations in the differences of pressures in different portions of the boiler and furnace.

In the drawings, 10 represents any well-known form of boiler beneath one end of which is a fire-pot 11 with the flue-passages 12 conducting the gaseous products of combustion to the stack or chimney 13.

While in the drawing a boiler as a means of generating steam is shown, it is obvious that the invention may be applied equally as well, not only to any other form of heating device in which a fire-pot and flue-passages for the products of combustion are used, but also to any apparatus in which the pressures vary in different portions thereof and of which it may be desired to obtain the ratio of the differences of pressures existing in different portions thereof.

In the oil-burning steam boiler shown in the drawing, the oil is supplied through the pipe 15 and is atomized and forced into the fire-pot 11 by steam or compressed air supplied through the pipe 14, the supply of oil and steam or air being controlled by suitable valves 43 and 44, and the air-supply by suitable openings 45. At some convenient point adjacent to the boiler are located two tubular members 16 and 17 of small diameter. The tubular member 16 is provided with an inclosed chamber 18 at one end and a similar chamber 19 at the opposite end, while the tubular member 17 is in a similar manner provided with the inclosed chambers 20 and 21.

The chamber 20 is connected by a pipe 24 with the exit 13 of the products of combustion, the mouth of said pipe 24 being turned so as to face in a direction opposite to the direction in which said products of combustion move. The chamber 21 is connected with the exit 13 at the same point, by a pipe 25, the said pipe 25 having its mouth at right angles to the direction of flow of the said products of combustion.

The chamber 18 is connected with the pipe 15 conveying the oil to the furnace by means of a pipe 22, the mouth of said pipe being turned so as to face in a direction opposite to the direction in which said oil moves. The chamber 19 is connected with the said pipe 15 at or near the same point by a pipe 23, the mouth of said pipe 23 being at right angles to the direction of flow of the said oil.

The tubular member 17 has at one end a terminal 32 and in alinement therewith at the opposite end is a terminal 33, these two terminals 32 and 33 being connected by a resistance wire 34. The tubular member 17 is partially filled with a column or thread of mercury 35 adapted to extend normally from one end terminal 32 or 33 to the central terminal 36. The remainder of the tubular member 17 is filled with a suitable liquid 46 which extends into and partially fills the chambers 20 and 21, the remainder of said chambers 20 and 21 being filled with air or gaseous products of combustion. In a similar manner the tubular member 16 is provided with the end terminals 27 and 28 and the center terminal 31 connected together by a resistance wire 29 immersed throughout a portion of its length in a column of mercury 30 adapted to extend normally from one end terminal 27 or 28 to the center terminal 31. The remainder of the tubular member 16 is filled with a suitable liquid 26 which extends into and partially fills the chambers 18 and 19, the remainder of said chambers being filled with the fuel oil communicating with that in the pipe 15.

The terminals 27 and 32 are connected by a wire 37 to one current main of any suitable electric circuit while in like manner the terminals 28 and 33 are connected by a wire 39 to the other current main of said electric circuit.

Interposed between the current main 38 and the central terminals 31 and 36 of the tubular members 16 and 17 and in circuit therewith are a plurality of indicating instruments 41 and 42 adapted to make simultaneous indications. These instruments may be of any desired form, such, for instance, as that shown and described in Letters Patent No. 791,785, issued June 6th, 1905.

Normally the threads of mercury 30 and 35 are so adjusted in the tubular members 16 and 17 that these threads of mercury will touch the corresponding end terminals 27 and 32 and cover the corresponding middle terminals 31 and 36 when there is no difference of pressure existing between the pipes 22 and 23, due to movement of the oil, and between the pipes 24 and 25, due to the movement of the products of combustion, respectively. It is obvious, however, that when any difference of pressure exists between the pipes 22 and 23, due to the setting up of a flow of oil into the furnace, and between the pipes 24 and 25, due to the passing of the products of combustion and excess air out of the exit 13, these will cause the threads or columns of mercury 30 and 35 to travel along the tubular members 16 and 17 to a new position in which each thus short-circuits a different portion of the corresponding resistance wire 29 or 34, thus altering the potential of the middle terminals 31 and 36 relative to that of the end terminals 27 and 28 and 32 and 33, and consequently altering the currents passing through the instruments 41 and 42, these operating simultaneously to indicate the ratio of the two said differences of pressure, on a suitably calibrated scale.

While the means shown in the drawing for short-circuiting a portion of the resistance wires 29 and 34 and changing the potential of the central terminals 31 and 36 when a current is passing through said resistance wires is a convenient form of apparatus for accomplishing this end, it is obvious that such device may be altered considerably without altering the principles of the present invention, the main object being to provide some means of varying the proportional length of that portion of the resistance wire (or some equivalent therefor) traversed by the electric current on its way to the indicating instrument in accordance with the variations in the difference of pressure in that portion of the device.

It is obvious that, while it is preferable to use in series two combination indicating instruments such as are shown, one of which may be placed in front of the operator and the other of which may be placed in the office of the works, it is not essential that the two instruments should be used, for a single instrument may be used for giving the necessary information to the operator to permit him to operate the device so as to secure the best results therefrom.

While the drawing shows and the specification describes the invention as applied to a boiler, it is quite obvious that the same may be applied to any apparatus in which the pressures vary in different portions thereof and of which it may be desired to obtain the ratio of the differences of pressures existing in different portions thereof.

This makes a very convenient form of indicator for displaying the variations in the differences of pressure in two portions of an apparatus, and by such indications thus made giving the required information to the operator to permit him to keep track of the actual conditions of operation of the apparatus and thereby better control the same. For instance, in the case of a heating apparatus the actual condition of the combustion process therein would be indicated to the fireman so that he could better regulate the fire to secure the most beneficial results.

It is believed that the operation and many advantages of the invention will be thoroughly understood from the foregoing.

Having thus described my invention, I claim:

1. In an apparatus of the class described, the combination with a device in which differences of pressure exist in different portions thereof; of a plurality of receptacles each containing a liquid; pipes leading from the ends of each of said receptacles to different portions of said device through which the said differences of pressures in said different portions are adapted to act on said liquid; and means including a resistance wire partially immersed in a liquid conductor co-acting with said liquid for indicating any variation in the ratio of the differences of pressures in said different portions of said device.

2. In an apparatus of the class described, the combination with a device in which differences of pressure exist in different portions thereof; of a plurality of U-shaped receptacles each containing a liquid; pipes leading from the ends of each of said receptacles to different portions of said device through which the differences of pressure existing in said different portions are adapted to act on said liquid; and means including a resistance wire partially immersed in a liquid conductor co-acting with said liquid for indicating any variation in the ratio of the differences of pressure in said different portions of said device.

3. In an apparatus of the class described, the combination with a device in which differences of pressure exist in different portions thereof; of an electrically operated indicating instrument; of a plurality of devices each including a resistance wire partially immersed in a liquid conductor interposed between said first mentioned device and instrument adapted to change the potential of the current to said instrument by the change in the differences of pressure in two portions of said device.

4. In an apparatus of the class described, the combination with a device in which differences of pressure exist in different portions thereof; of an electrically operated indicating instrument; and of a plurality of devices, each including a resistance wire partially immersed in a conducting fluid movable lengthwise of said wire by the variations in pressure acting thereon, interposed between said first mentioned device and said instrument adapted to change the potential of the current to said instrument by the change of pressures in two portions of said device.

5. In an apparatus of the class described, the combination with a device in which differences of pressure exist in different portions thereof; of an electrically operated indicating instrument; and of a plurality of devices each including a resistance wire partially immersed in a liquid conductor interposed between said first mentioned device and said instrument for regulating the strength of electric current passing to said instrument by the variations in pressure in two portions of the said device acting upon said liquid conductor to move it lengthwise of said wire.

6. In an apparatus of the class described, the combination with a device in which differences of pressure exist in different portions thereof; of an electrically operated indicating instrument; of an inclosed receptacle; pipes leading from opposite ends thereof to two separated portions of said device; means passing through said receptacle for conducting an electric current to operate said instrument; and means contained in said receptacle for varying the potential of said current with the variations in pressure in the two ends of said receptacle.

7. In an apparatus of the class described, the combination with a device in which differences of pressure exist in different portions thereof; of an electrically operated indicating instrument; of an inclosed receptacle; pipes leading from opposite ends thereof to two portions of said device; means passing through said receptacle for conducting an electric current to operate said instrument; and a thread of conducting fluid contained in said receptacle adapted to be moved into various positions therein by the variations in pressure at either end thereof and thereby vary the potential of the electric current passing to said instrument.

8. In an apparatus of the class described, the combination with a device in which differences of pressure exist in different portions thereof; of an electrically operated indicating instrument; of an inclosed receptacle partially filled with liquid; pipes leading from the ends thereof to two portions of said device; means passing through said receptacle for conducting an electric current to operate said instrument; and a thread of a liquid conductor immersed in the said liquid adapted to be moved into various positions in said receptacle by the variations in pressure at either end thereof and thereby vary the potential of the electric current passing to the said instrument.

9. In an apparatus of the class described, the combination with a device in which differences of pressure exist in different portions thereof; of an electrically operated indicating instrument; of two inclosed receptacles each partially filled with a liquid; pipes leading from each end of each of said receptacles to a different portion of said device; a resistance wire passing through each of said receptacles through which the current to the indicating instrument passes; a thread of liquid conductor in each of said receptacles in which said wire is immersed and adapted to be acted upon to move it longitudinally of said wire by the variations in pressure at either end of said receptacle; and a central terminal in either of said receptacles, one end of which connects with said thread of liquid conductor while the other connects with said instrument.

10. In an apparatus of the class described, the combination with a device in which differences of pressure exist in different portions thereof; of an electrically operated indicating instrument; of two inclosed receptacles each filled with fluids of different densities; pipes leading from each end of each of said receptacles to a different portion of said device; a resistance wire passing through each of said receptacles through which the current to the indicating instrument passes; a thread of liquid conductor in each of said receptacles in which said wire is immersed and adapted to be acted upon to move it longitudinally of said wire by the variations in pressure at either end of said receptacle; and a central terminal in either of said receptacles, one end of which connects with said thread of liquid conductor while the other connects with said instrument.

11. In an apparatus of the class described, the combination with a device in which differences of pressure exist in different portions thereof; of an electrically operated indicating instrument; of two inclosed receptacles each filled with fluids of different densities; pipes leading from each end of each of said receptacles to different portions of said device; a resistance wire passing through each of said receptacles through which the current to the indicating instrument passes; a thread of liquid in each of said receptacles in which said wire is immersed separating portions of liquid of different electrical conductivity and adapted to be acted upon to move it longitudinally of said wire by the variations in pressure at either end of said receptacle; and a central terminal in either of said receptacles, one end of which connects with said resistance wire immersed in the thread of liquid while the other connects with said instrument.

12. In an apparatus of the class described, the combination with a device in which the movement of fluids exists in different portions thereof; of an electrically operated indicating instrument; of two inclosed receptacles each filled with fluids of different densities; pipes leading from each end of each of said receptacles to different portions of said device; and adapted to transmit to said receptacles pressures which vary with the variations in the movements of the fluids in said device; a resistance wire passing through each of said receptacles through which the current to the indicating instrument passes; a thread of liquid in each of said receptacles separating liquids of different electrical conductivity in which said resistance wire is immersed and adapted to be acted upon to move it longitudinally of said wire by the variations in pressure at either end of said receptacle; and a central terminal in each of said receptacles, one end of which connects with said resistance wire while the other connects with said instrument.

13. In an apparatus of the class described, the combination with a device in which differences of pressure exist in different portions thereof; of a receptacle containing a thread composed of fluids of different electrical conductivities; a resistance wire immersed in said thread of fluids and terminating outside of said receptacle; an electric circuit to the source of electric current to which the said terminals are connected; a central contact extending into the said thread of fluids and connected to the said resistance wire; an indicating instrument connected to said contact and to another portion of the said electric circuit; and means whereby the pressure in different portions of the said device will act on the opposite ends of said thread of fluids.

14. In an apparatus of the class described, the combination with a device in which movements of fluids exist in different portions thereof; of a receptacle containing a thread composed of fluids of different electrical conductivities; a resistance wire immersed in said thread of fluids and terminating outside of said receptacle; an electric circuit to the source of electric current to which the said terminals are connected; a central contact extending into the said thread of fluids and connected to the said resistance wire; an indicating instrument connected to said contact and to another portion of the said electric circuit; and means whereby the movement of fluid in a portion of said device will act upon the opposite ends of said thread of fluids.

15. In an apparatus of the class described, the combination with a device in which differences of pressure exist in different portions thereof; of a plurality of receptacles each containing a resistance wire immersed in a thread of fluids of different electrical conductivities and terminating outside of said receptacle; a source of electric current; a plurality of electric circuits from the source of current and including the resistance wires in the said receptacles; an electrically operated indicating instrument connected to said electric circuits; and means whereby the pressures in different portions of the device will act upon and cause movement in the threads of fluids.

16. In an apparatus of the class described, the combination with a device in which differences of pressure exist in different portions thereof; of a plurality of receptacles each containing a liquid and a movable conductor of electricity; pipes leading from the ends of each of said receptacles to different portions of said device through which the said differences of pressures in said different portions are adapted to act on said liquid and through it said movable conductor; a resistance wire passing through said liquid and movable conductor, between two terminals; a central terminal communicating with said movable conductor; and an indicating device electrically connected to said end terminals and central terminals.

Signed by me at Habana, Cuba, this twenty-sixth day of April, in the year nineteen hundred and nine.

ASA WHITE KENNEY BILLINGS.

Witnesses:
HENRY P. STARRETT,
VICTOR NARNAUD.